United States Patent
Wei

(10) Patent No.: US 11,262,526 B2
(45) Date of Patent: Mar. 1, 2022

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 183 days.

(21) Appl. No.: 16/528,685

(22) Filed: Aug. 1, 2019

(65) Prior Publication Data

US 2020/0049936 A1 Feb. 13, 2020

(30) Foreign Application Priority Data

Aug. 8, 2018 (CN) .......................... 201821284127.0

(51) Int. Cl.
*G02B 7/02* (2021.01)

(52) U.S. Cl.
CPC .................................... *G02B 7/028* (2013.01)

(58) Field of Classification Search
CPC .......... G02B 7/02; G02B 7/028; G02B 7/021; G02B 7/022; G02B 7/006; G02B 7/1815; G02B 3/00; G02B 13/003; G02B 13/18; G02B 27/00; G02B 27/0006; H04N 5/225; H04N 5/2252; H04N 5/2253; H04N 5/2254; G03B 11/00; G03B 11/041

USPC ....... 359/723, 511, 512, 811, 819, 826, 827, 359/830; 369/112.23, 112.24, 112.22

See application file for complete search history.

(56) References Cited

U.S. PATENT DOCUMENTS

2004/0239794 A1\* 12/2004 Saito .................... H04N 5/2253
348/340
2017/0257533 A1\* 9/2017 Takama ................. G02B 7/006

\* cited by examiner

*Primary Examiner* — Jie Lei
(74) *Attorney, Agent, or Firm* — W&G Law Group

(57) ABSTRACT

Provided is a lens module including a lens, a lens barrel for accommodating the lens, a lens seat, and an optical filter disposed in the lens seat. The optical filter divides a space defined by the lens barrel and the lens seat into a first space and a second space. The first space is located at an object side of the optical filter, and the second space is located at the image side of the optical filter. The lens seat is provided with an exhaust channel communicating the first space with the outside. An air guiding groove is formed by recessing from installation surface towards the object side and communicates the second space with the exhaust channel. The air guiding groove includes a first groove close to the first space and a second groove extending from an end of the first groove while being bent towards the inner ring surface.

7 Claims, 2 Drawing Sheets

LENS MODULE

TECHNICAL FIELD

The present disclosure relates to the field of optical lenses, and in particular, to a lens module.

BACKGROUND

In recent years, with the development of science and technology, electronic devices have become more and more intelligent. In addition to a digital camera, portable electronic devices, such as a tablet PC and a mobile phone, are also equipped with lens modules. In the related art, the lens module generally includes a lens, a lens barrel for accommodating the lens and a lens seat for accommodating the lens barrel.

The inventors have found the following problem in the related art: an image sensing part close to an image side of the lens seat will dissipate heat while processing light incident from a light-passing hole of the lens barrel, which leads to a relatively high temperature inside the lens module and further directly and adversely affects the performance of the lens module.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments.

Figure 1:
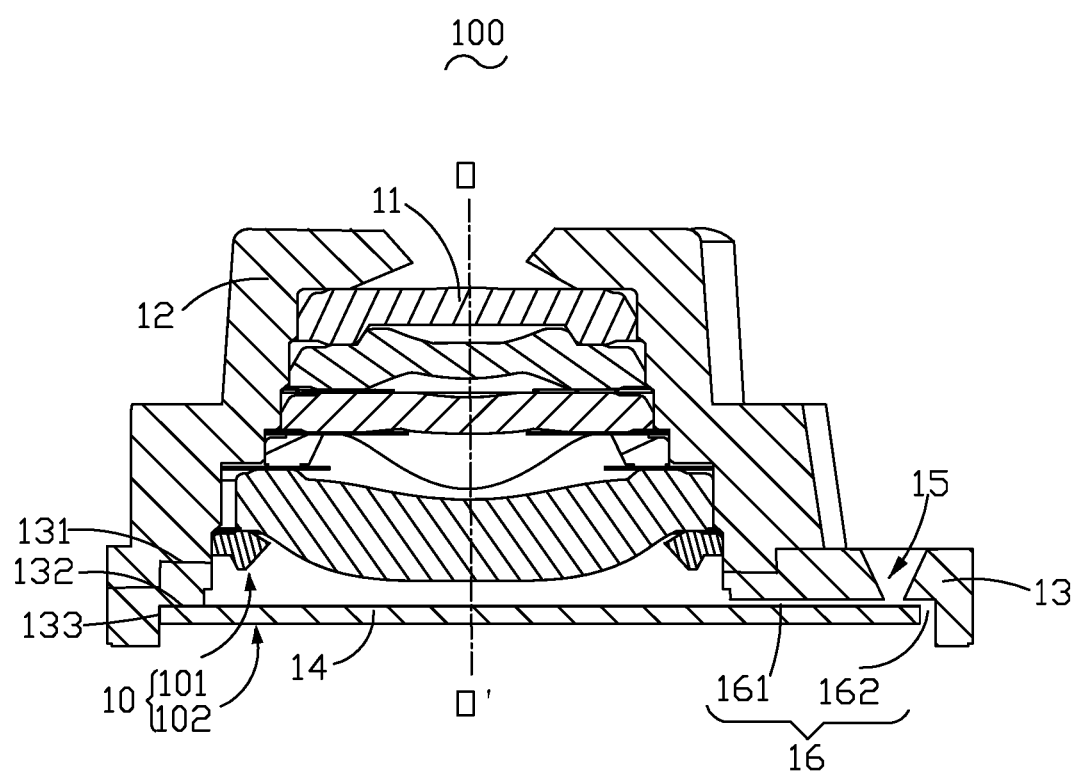
FIG. 1 is a schematic cross-sectional view of a lens module provided by an embodiment of the present disclosure.
Figure 2:
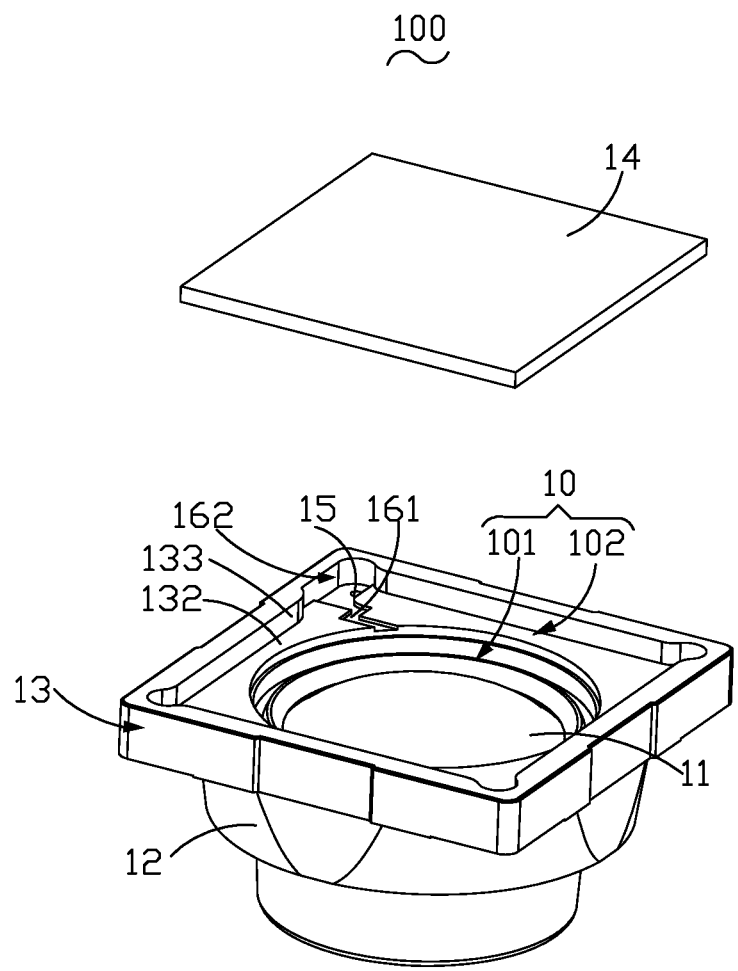
FIG. 2 is a schematic exploded view of the lens module provided by the embodiment of the present disclosure.

An embodiment of the present disclosure relates to a lens module 100. As shown in FIGS. 1-2, the lens module 100 includes a lens 11, a lens barrel 12, a lens seat 13 and an optical filter 14. The lens barrel 12 accommodates the lens 11. The lens seat 13 is connected to an edge of the lens barrel 12 close to an image side. The optical filter 14 is disposed in the lens seat 13 and divides a space 10 defined by the lens barrel 12 and the lens seat 13 into a first space 101 and a second space 102. The optical filter 14 includes an object side surface 141, an image side surface 142 disposed opposite to the object side surface 141, and a connection surface 143 connecting the image side surface 142 with the object side surface 141. The lens seat 13 includes an matching surface 131 for matching the lens barrel 12, an installation surface 132 disposed opposite to the matching surface 131 and fixed to the object side surface 141, and an inner ring surface 133 extending from an edge of the installation surface 132 towards the image side and surrounding a periphery of the connection surface 143. The first space 101 is located at an object side of the optical filter 14. The second space 102 is located at the image side of the optical filter 14. The lens seat 13 is provided with an exhaust channel 15 penetrating through the lens seat 13 and communicating the first space 101 with the outside. An air guiding groove is formed by recessing from the installation surface 132 towards the object side, and configured to communicate the second space 102 with the exhaust channel 15. The air guiding groove 16 includes a first groove 161 close to the first space 102 and a second groove 162 extending from an end of the first groove 161 facing away from the first space 102 while being bent in a direction facing towards the inner ring surface 133.

Compared with the related art, in the embodiment of the present disclosure, the optical filter 14 divides the space 10 defined by the lens barrel 12 and the lens seat 13 into the first space 101 and the second space 102; the first space 101 is located at the object side of the optical filter 14, the second space 102 is located at the image side of the optical filter 14; the lens seat 13 is provided with the exhaust channel 15 penetrating through the lens seat 13 and communicating the first space 101 with the outside; the air guiding groove 16, formed by recessing from the installation surface 132 towards the object side, communicates the second space 102 with the exhaust channel 15. That is, both the exhaust channel 15 and the air guiding groove 16 communicate with the outside. In this way, the heat, which is generated in the second space 102 by an image sensing part on the image side of the optical filter 14, can be exhausted to the outside through the air guiding groove 16 and the exhaust channel 15, and part of the heat in the second space 102, which is transferred into the first space 101, can also be exhausted to the outside through the exhaust channel 15. Therefore, a closed space in a traditional lens module is avoided, thereby preventing the performances of the lens module 100 from being adversely affected by an excessively high temperature inside the lens module 100. Accordingly, the lens module 100 has better performances.

The details of the lens module provided by the present embodiment are specifically described below. The following description is merely intended to facilitate understanding of the provided implementation, but not to limit the present disclosure.

In the present embodiment, a size of the matching surface 131 is larger than an orthographic projection of the lens barrel 12 on the matching surface 131. The exhaust channel 15 sequentially penetrates through the installation surface 132 and the matching surface 131. An end of the first groove 161 facing away from the second groove 162 communicates with the first space 101.

It can be understood that the second groove 162 communicates with the exhaust channel 15. For example, an end of the second groove 162 facing away from the first groove 161 extends to the inner ring surface 133. An end of the optical filter 14 close to the air guiding groove 16 is spaced apart from the inner ring surface 133.

For example, the inner ring surface 133 in enclosed to form a rectangle shape. The air guiding groove 16 is formed at a position of the installation surface 132 corresponding to a corner of the inner ring surface 133. In the present embodiment, the installation surface 132 also has a shape of rectangular. A circular light-passing hole around an optical axis OO' is provided in the rectangular installation surface 132. Therefore, the corners of the rectangular installation surface 132 have an larger area than the central regions corresponding to four straight walls of the inner ring surface 133. By providing the air guiding groove 16 at the position of the installation surface 132 corresponding to a corner of the inner ring surface 133, the air guiding groove 16 can be easily formed on a larger area. In this regard, the heat inside the lens module 100 can exhausted while reducing the adverse effects on the structural strength of the lens seat 13 as much as possible.

It should be noted that the exhaust channel 15 can extend in a direction parallel to the optical axis OO' of the lens module 100. It is easier, time-saving, and labor-saving to directly form the exhaust channel 15 along the direction of the optical axis OO', i.e., forming the exhaust channel 15 in a direction perpendicular to the installation surface 132 and the matching surface 131.

It should be understood that the exhaust channel 15 is tapered, and has an aperture increasing from the image side to the object side. In this way, the adverse effect on the structural strength of the lens seat 13, which are caused by forming a cylindrical through hole having a relatively large aperture in the lens seat 13, can be reduced, and in the meantime, the exhaust can be accelerated to prevent the performance of the lens module 100 from being adversely affected by excessive heat in the lens module 100.

It can be understood that a plurality of exhaust channels 15 and a plurality of air guiding grooves 16 can be provided. Each exhaust channel 15 corresponds to one air guiding groove 16 and communicates with the corresponding air guiding groove 16. With such design, the number of exhaust paths can be increased, thereby further accelerating heat exhausting.

In addition, groups each consisting of the exhaust channel 15 and the air guiding groove 16 communicating with the exhaust channels 15 are equally spaced around the optical axis OO' of the lens module 100. The equal spaced distribution of the groups of exhaust channel 15 and air guiding groove 16 around the optical axis OO' of the lens module 100 ensure the structural symmetry and orderliness of the whole lens module 100. Therefore, the lens module 100 has an uniform stress tolerance in all directions are identical, thereby improving the reliability of the whole lens module 100.

In the present embodiment, the lens barrel 12 and the lens seat 13 are formed in to one piece, thereby reducing the manufacture procedures and intensify the fixation between the lens barrel 12 and the lens seat 13. In this way, the reliability of the lens module 100 is improved. In an alternative embodiment of the present disclosure, the lens barrel and the lens seat can also be separate parts, which can be selected according to design requirements.

Those skilled in the art can understand that the above embodiments are specific embodiments for implementing the present disclosure, and various changes with respect to form or detail can be made without departing from the spirit and scope of the present disclosure.

What is claimed is:

1. A lens module, comprising:
   a lens assembly, comprise at least one lens;
   a lens barrel for receiving the lens assembly;
   a lens seat connected to an edge of the lens barrel close to an image side; and
   an optical filter disposed in the lens seat,
   wherein the optical filter divides a space defined by the lens barrel and the lens seat into a first space and a second space,
   the optical filter comprises an object side surface, an image side surface disposed opposite to the object side surface, and a connection surface connecting the image side surface with the object side surface,
   the lens seat comprises an matching surface for matching the lens barrel, an installation surface opposite to the matching surface and fixed to the object side surface, and an inner ring surface extending from an edge of the installation surface towards the image side and surrounding the connection surface,
   the first space is located at an object side of the optical filter, and the second space is located at an image side of the optical filter,
   the lens seat is provided with an exhaust channel penetrating through the lens seat and communicating the first space with outside,
   an air guiding groove is formed by recessing from the installation surface towards an object side and communicates the second space with the exhaust channel, and the air guiding groove comprises a first groove close to the first space and a second groove extending from an end of the first groove facing away from the first space while being bent in a direction facing towards the inner ring surface,
   wherein the matching surface has a size larger than an orthographic projection of the lens barrel on the matching surface, the exhaust channel sequentially penetrates through the installation surface and the matching surface, and an end of the first groove facing away from the second groove communicates with the first space.

2. The lens module as described in claim 1, wherein second groove communicates with the exhaust channel.

3. The lens module as described in claim 2, wherein an end of the second groove facing away from the first groove extends to the inner ring surface, and an end of the optical filter close to the air guiding groove is spaced apart from the inner ring surface.

4. The lens module as described in claim 2, wherein the exhaust channel extends in a direction parallel to an optical axis of the lens module.

5. The lens module as described in claim 4, wherein the exhaust channel has a tapered shape, and has an aperture increasing from the image side to the object side.

6. The lens module as described in claim 5, wherein the inner ring surface is enclosed to form a rectangle, and the air guiding groove is formed at a position of the installation surface corresponding to a corner of the inner ring surface.

7. The lens module as described in claim 1, wherein the lens barrel and the lens seat are formed into one piece.

* * * * *